(12) United States Patent
Roth

(10) Patent No.: US 7,625,500 B2
(45) Date of Patent: Dec. 1, 2009

(54) SECURITY FEATURE

(75) Inventor: Joseph D. Roth, Springboro, OH (US)

(73) Assignee: NCR Corporation, Dayton, OH (US)

( * ) Notice: Subject to any disclaimer, the term of this patent is extended or adjusted under 35 U.S.C. 154(b) by 225 days.

(21) Appl. No.: 11/645,463

(22) Filed: Dec. 26, 2006

(65) Prior Publication Data

US 2008/0149895 A1 Jun. 26, 2008

(51) Int. Cl.
*C09C 1/28* (2006.01)
*C09D 5/29* (2006.01)
*C09D 7/12* (2006.01)

(52) U.S. Cl. .................... 252/301.16; 252/301.4 F; 252/301.4 R; 428/402; 428/404; 428/406

(58) Field of Classification Search .......... 428/690, 428/402, 406, 404; 252/301.4 F, 301.4 R, 252/301.16
See application file for complete search history.

(56) References Cited

U.S. PATENT DOCUMENTS 5,961,923 A 10/1999 Nova et al.
6,006,582 A 12/1999 Bhandari et al.
2007/0026407 A1* 2/2007 Matsumoto et al. ............ 435/6

FOREIGN PATENT DOCUMENTS

| JP | 2004-325432 A | 11/2004 |
| KR | 10-0620959 B1 | 8/2006 |
| WO | WO 2005/023961 | * 3/2005 |

OTHER PUBLICATIONS

English Language, Abstract of KR 10-0620959 B1 as provided to Applicant in an e-mail from Doohan Chung of the Korean Intellectual Property Office dated Aug. 14, 2008.

* cited by examiner

*Primary Examiner*—C. Melissa Koslow
(74) *Attorney, Agent, or Firm*—Adam Bennett; Charles Q. Maney

(57) ABSTRACT

A security feature having unique photoluminescent properties and a method for making the security feature. The security feature includes a silica carrier and a rare earth dopant dispersed throughout at least a portion of the silica carrier. The rare earth dopant includes a rare earth ion to which ligands and/or inorganic sensitizers are associated. The ligands and/or inorganic sensitizers are positioned to absorb energy and transfer the absorbed energy to the rare earth ion.

9 Claims, 12 Drawing Sheets

FIG. 5
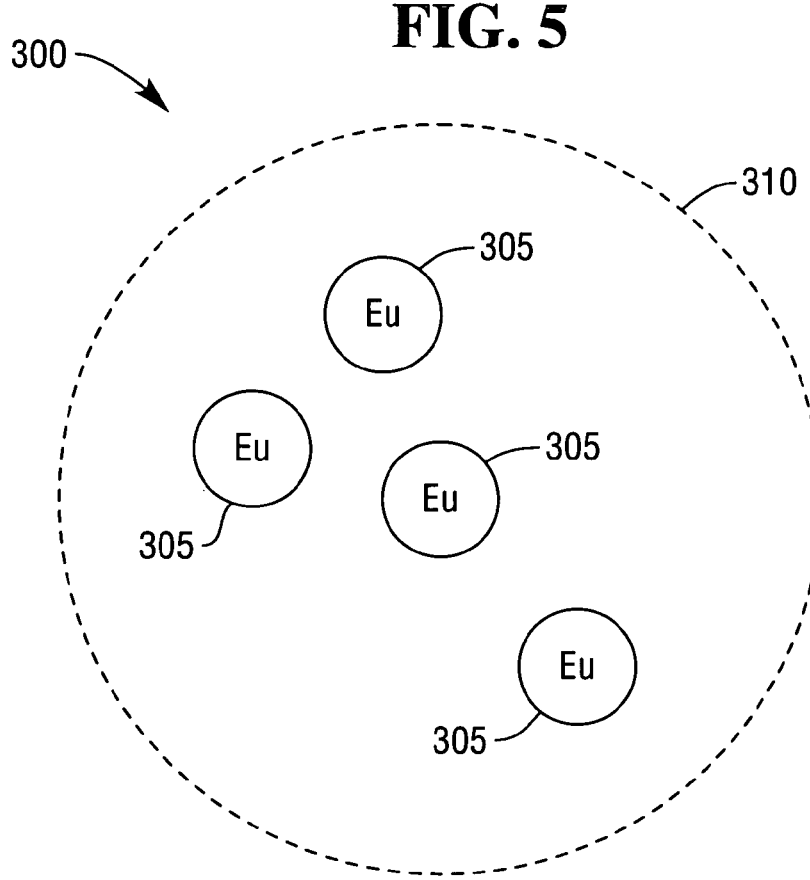
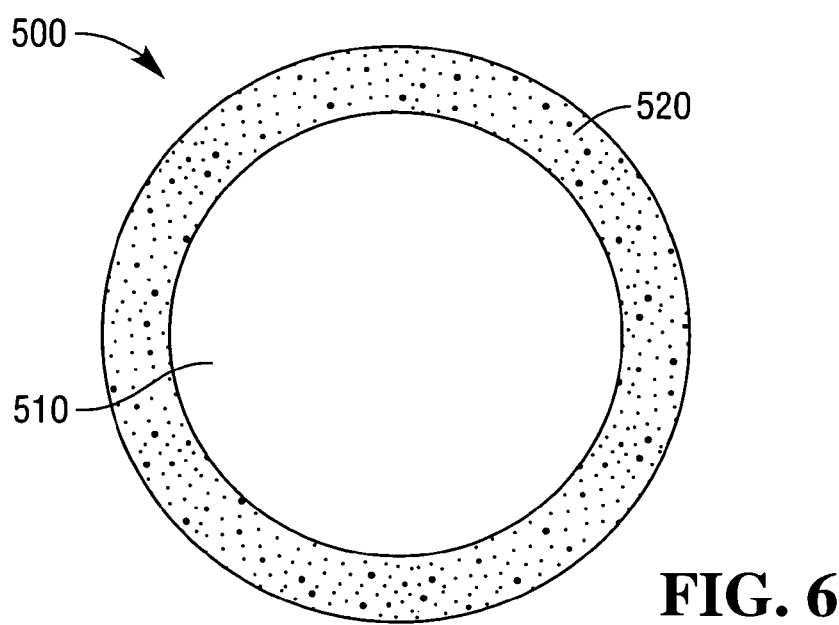
FIG. 6

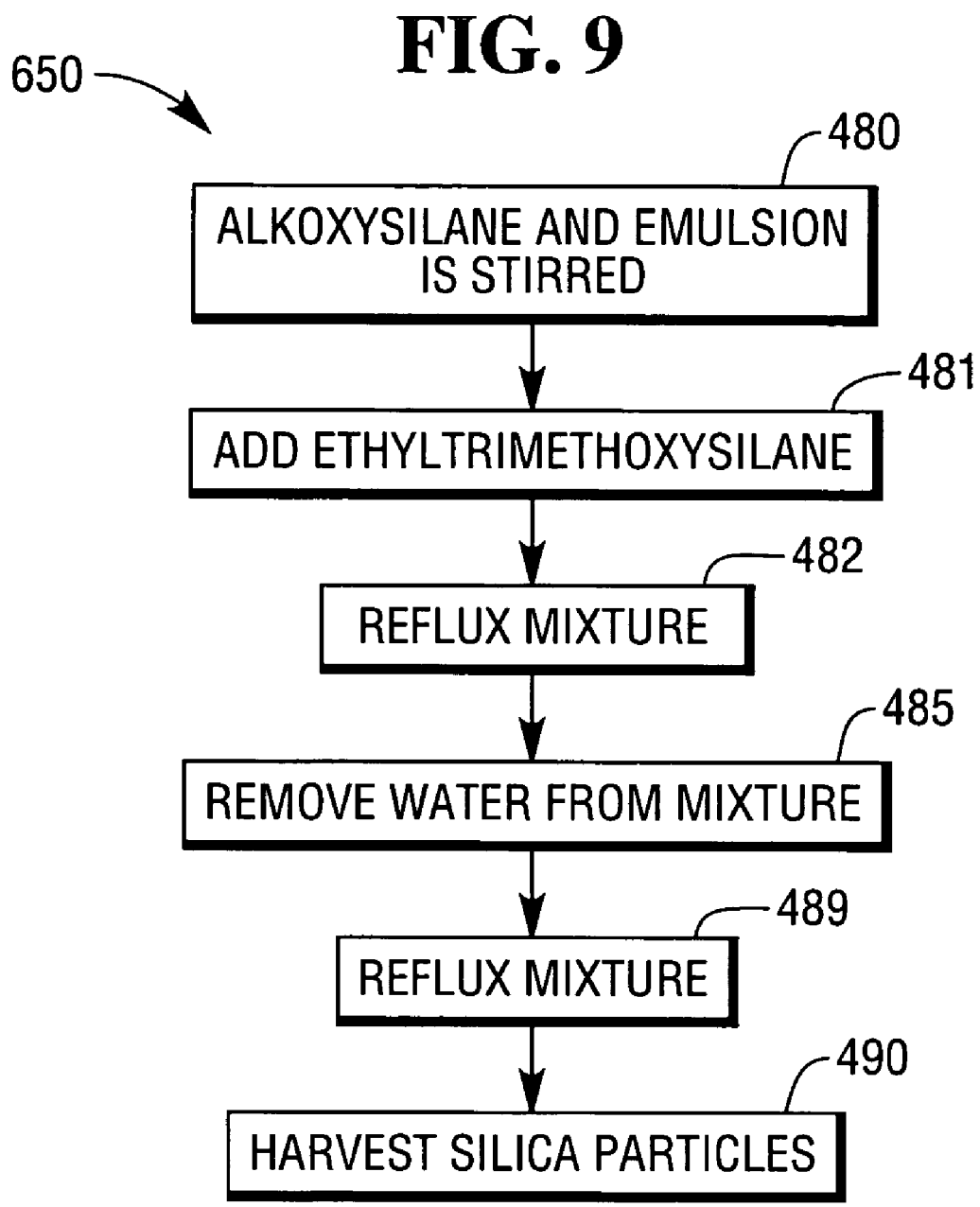

FIG. 10B
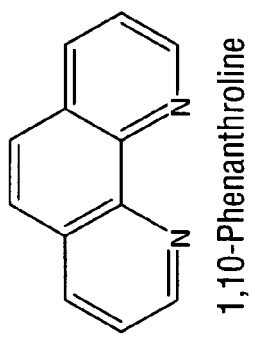
1,10-Phenanthroline
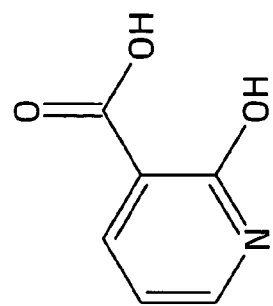
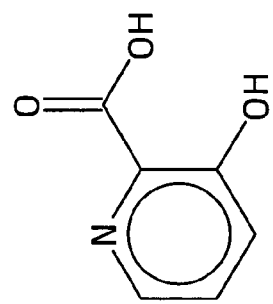
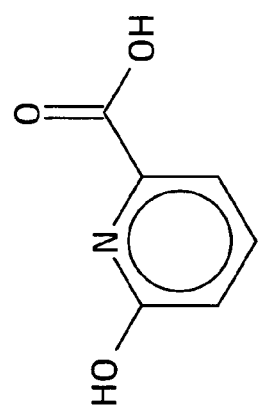
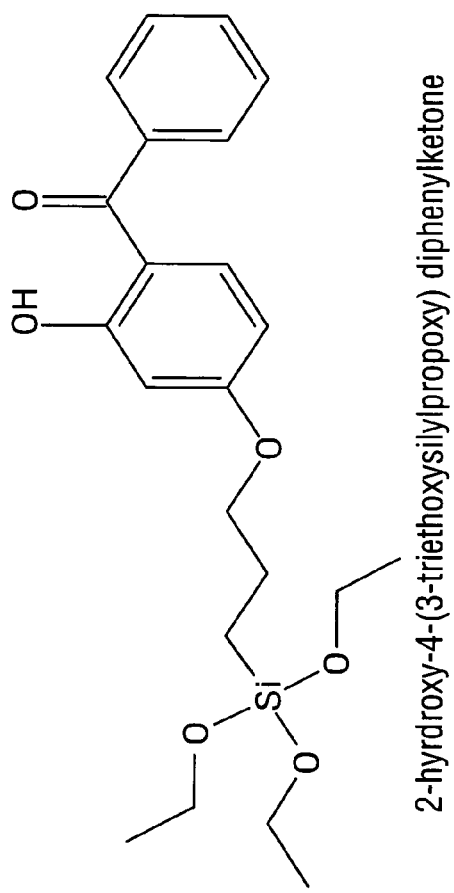
2-hydroxy-4-(3-triethoxysilylpropoxy) diphenylketone

SECURITY FEATURE

BACKGROUND

Security features are used to reduce or prevent counterfeiting of items. These items may have a high intrinsic value, such as banknotes, or they may be critical parts in other items, such as brake pads in fighter planes. By tagging an item with a security feature, the authenticity of the item can be verified by validating that the security feature is genuine.

Many different types of security feature are available. One type is an optically detectable security feature comprising silica particles doped with rare earth ions.

Rare earth ions are known to have certain photoluminescent properties that make them useful in security features. In particular, when a rare earth ion is excited it emits a fluorescent fingerprint, in the form of well defined and relatively narrow, non-overlapping spectral peaks. However, due to the small size of security features used (less than five micron diameter), it is difficult to generate sufficient luminescence by excitation of the rare earth ion, because relatively few photons are absorbed by the rare earth ions.

U.S. Pat. No. 7,129,506 to Ross et al. discloses a unique optically detectable marker that comprises a glass carrier incorporating a rare earth ion, which overcomes the rare earth ion's limited ability to absorb light. When the rare earth dopant is incorporated into the glass, new bonds are formed in the doped glass, thus altering the electron arrangement and hence the energy levels of absorption and fluorescent emission.

The security features disclosed in Ross et al. suffer certain limitations. For example, the security features disclosed by Ross et al cannot easily, consistently, and uniformly be made any smaller than approximately five microns. The difficulty in making such security features smaller than five microns excludes the use of the markers in certain applications.

Furthermore, the security features in Ross et al are manufactured using a cast and smash technique that involves casting an ingot of rare earth doped glass and then breaking the ingot into small pieces for use as a security feature.

SUMMARY OF THE INVENTION

According to a first aspect of the present invention there is provided a security feature, which includes: a silica carrier comprising a silica network; and a first rare earth dopant dispersed throughout at least a portion of the silica carrier. The first rare earth dopant includes a rare earth ion having at least one ligand coordinated thereto. The rare earth ion may be selected from the group consisting of Scandium, Yttrium, Lanthanum, Cerium, Praseodymium, Neodymium, Promethium, Samarium, Europium, Gadolinium, Terbium, Dysprosium, Holmium, Erbium, Thulium, Ytterbium, Lutetium and Thorium.

Preferably, the ligand is positioned to absorb energy and transfer the absorbed energy to the rare earth ion. In some embodiments, the ligand will be positioned to block contaminates from coordinating with the rare earth ion.

Typically, the first rare earth dopant includes a plurality of ligands coordinated to the rare earth ion. The ligands coordinated to the rare earth ion may be all the same type or a combination of different types of ligands.

Typically, the first rare earth dopant is bonded to the silica network via a bond between the at least one ligand and the silica network. While, in other embodiments the rare earth dopant is trapped within the silica network.

In some embodiments the security feature further includes a second rare earth dopant dispersed throughout at least a portion of the silica carrier. Typically, the first rare earth dopant and the second rare earth dopant are different types of rare earth dopants.

In most embodiments, the silica carrier will have a porous surface. In these embodiments, the silica carrier may further include a plurality hydrocarbon molecules each having a bond end and a hydrophobic end. The bond end of the plurality of hydrocarbon molecules is bonded to the surface of the carrier, thereby blocking pores on the porous surface and forming a hydrophobic layer around the silica carrier.

According to a second aspect of the present invention there is provided a security feature, which includes: a silica core having a first rare earth dopant profile; and a silica shell having a second rare earth dopant profile and surrounding the silica core. Typically, the first dopant profile is different from the second dopant profile.

In some embodiments, the first rare earth dopant profile comprises a rare earth dopant dispersed throughout the silica core. Typically, this rare earth dopant includes a rare earth ion having at least one ligand coordinated thereto. Preferably, the ligand is positioned to absorb energy and transfer the absorbed energy to the rare earth ion. Similarly, the ligand is positioned to block contaminates from coordinating with the rare earth ion.

In other embodiments, the rare earth dopant includes a rare earth ion having an inorganic sensitizer associated therewith. The inorganic sensitizer is positioned to absorb energy and transfer it to the rare earth ion.

In still other embodiments, the first rare earth dopant profile includes at least two types of rare earth dopants dispersed throughout the silica core, while in others the first rare earth dopant profile does not include any rare earth dopant. Similarly, in some embodiments the second rare earth dopant profile does not include any rare earth dopant. In even other embodiments, the first rare earth dopant profile comprises a first type of rare earth dopant dispersed throughout the silica core and the second rare earth dopant profile comprises a second type of rare earth dopant dispersed throughout the silica shell.

In some embodiments, the silica shell may include a plurality of silica layers radially spaced from the silica core. Typically, the plurality of silica layers include at least an inner layer, a middle layer and an outer layer, where the second rare earth dopant profile comprises a first rare earth dopant dispersed throughout the inner layer and a second rare earth dopant dispersed throughout the middle layer. Often the outer layer contains no rare earth dopant.

It will be appreciated, that typically the silica shell has a porous surface. In such cases, the security feature may further include a plurality of hydrocarbon molecules each having a bond end and a hydrophobic end. The bond end of the plurality of hydrocarbon molecules is bonded to the surface of the silica shell, thereby blocking pores on the porous surface and forming a hydrophobic layer around the silica shell.

According to a third aspect of the present invention there is provided a security feature, which includes: a silica carrier comprising a silica network; and a first rare earth dopant dispersed throughout at least a portion of the silica carrier, the first rare earth dopant including a rare earth ion; and an inorganic sensitizer, wherein the inorganic sensitizer is positioned to absorb energy and transfer the absorbed energy to the rare earth ion. The rare earth ion may be selected from the group including Scandium, Yttrium, Lanthanum, Cerium, Praseodymium, Neodymium, Promethium, Samarium, Europium, Gadolinium, Terbium, Dysprosium, Holmium, Erbium, Thulium, Ytterbium, Lutetium and Thorium.

Typically, the rare earth ion is trapped within the silica network, though in some embodiments the rare earth ion is bonded to the silica network.

In most embodiments, the silica carrier provides a porous surface. In such embodiments, the security feature may further include a plurality of hydrocarbon molecules each having a bond end and a hydrophobic end. The bond end of the plurality of hydrocarbon molecules being bonded to the surface of the carrier, thereby blocking pores on the porous surface and forming a hydrophobic layer around the silica carrier.

In a forth aspect of the present invention there is provided, a method for producing a silica particle impregnated with a rare earth dopant. This method includes: dissolving a first rare earth dopant in a reaction solution; adding an alkoxysilane to the reaction solution; and adding a mixture of water and ammonia hydroxide to the reaction solution, after the first rare earth dopant has been dissolved and the alkoxysilane has been added, wherein a resulting first series of reactions synthesizes a plurality of silica particles, each particle having the first rare earth dopant dispersed therethrough.

Typically, this method further includes the step of harvesting the silica particles after the first series of reactions has ceased. The method may also include the step of calcinating the silica particles after they have been harvested.

In some embodiments the method further includes: adding additional water to the reaction solution, after the silica particles have been synthesized; adding additional alkoxysilane to the reaction solution, after the additional water is added to the basic reaction solution, wherein a resulting second series of reactions synthesizes a first silica shell around each of the plurality of silica particles. Other embodiments may further include: dissolving a second rare earth dopant in the reaction solution, prior to adding the additional alkoxysilane, such that the silica shell has the second rare earth dopant dispersed therethrough.

In some embodiments, a plurality of hydrocarbon molecules are reacted to each of the plurality of silica particles, thereby synthesizing a hydrophobic layer around each of the plurality of silica particles.

In some embodiments, dissolving a first rare earth dopant in a reaction solution further includes: preparing a first solution of ligands dissolved in a solvent; preparing a second solution of rare earth complexes dissolved in a solvent; and combining the first solution and the second solution. Typically, the rare earth complexes comprise a rare earth ion coordinated to an atom or molecule, such as a anhydrous salt. When the first and second solutions are combined the ligands of the first solution coordinate with the rare earth ions of the second solution, thereby creating a ligated rare earth dopant. Typically the solvents used are anhydrous solvents.

BRIEF DESCRIPTION OF THE DRAWINGS

Benefits and advantages of the present invention will become apparent from the subsequent description of example embodiments, taken in conjunction with the accompanying drawings, in which:

FIG. 5 shows a schematic representation of an optically detectable security feature (in the form of a silica particle) in accordance with another embodiment of the present invention;

FIG. 6 shows a schematic representation of an optically detectable security feature (in the form of a silica particle) in accordance with another embodiment of the present invention;

FIG. 9 shows a process for producing the optically detectable security feature of FIG. 6; and FIGS. 10A-D show the structural formula of several of ligands that may be selected for incorporation into a rare earth complex.

DETAILED DESCRIPTION

Figure 1:
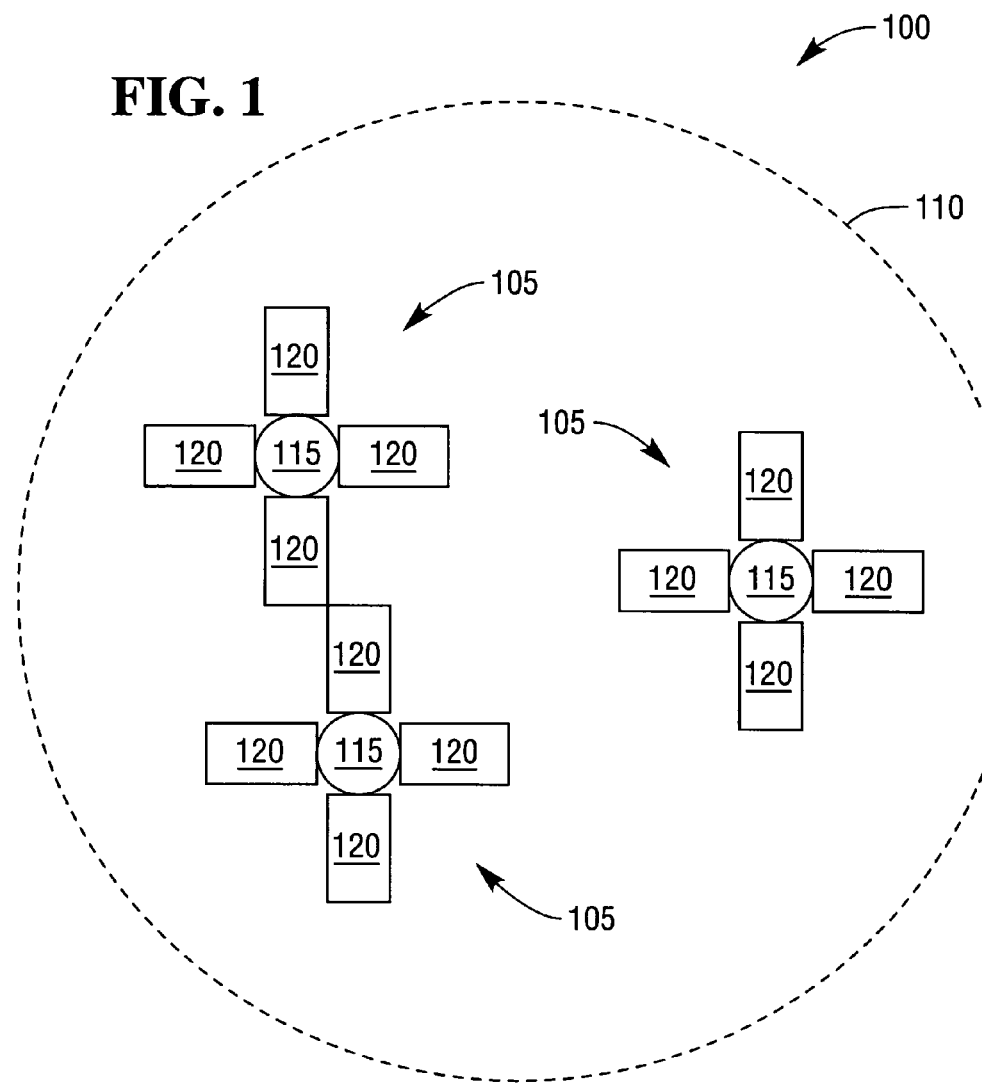
FIG. 1 shows a schematic representation of an optically detectable security feature (in the form of a silica particle) in accordance with an embodiment of the present invention.

The following discussion discloses various embodiments of nano-sized silica particles impregnated with one or more rare earth dopants. These silica particles have a unique photoluminescent fingerprint, i.e. distinctive photoluminescent properties, such that they can be used as taggants or markers in security and medical diagnostic applications.

The rare earth dopant may be in the form of a rare earth ion or chelate (i.e. a rare earth complex comprising one or more ligands coordinated to a rare earth ion). The 4f orbital of a rare earth ion is what gives the silica particle distinctive photoluminescence properties. Since the 4f orbital is typically beneath the ion's 6s, 5p and 5d orbitals, the 4f orbital is not involved in bonding and thus is largely shielded from the local environment. The result of this is that the emission spectra arising from the f-f transitions are narrow and largely insensitive to the local environment, i.e. the frequency of the emission does not change any appreciable amount with changes to the local environment around the rare earth ion.

However it will be appreciated that the relative peak intensity of a rare earth ion may be affected by its local environment, thereby altering the photoluminescent fingerprint of the silica particle. For example, when different types of rare earth ions are adjacent to each other in the same silica particle one rare earth ion may absorb energy and then transfer it to the other rare earth ion. This phenomenon may result in the intensity transfer from the spectral response peak of the first rare earth ion to the spectral response peak associated with the second rare earth ion.

Similarly, sensitizers may be incorporated into the silica particle to increase the intensity of the silica particle's spectral response. Sensitizers generally work by absorbing energy and transferring it to the rare earth ion, which ultimately increases the intensity of the spectral response. Sensitizers may be inorganic or organic.

Inorganic sensitizers may be incorporated into the silica particles, such that they are closely associated, but not bonded, with a rare earth dopant. The inorganic sensitizer absorbs energy and transfers it to closely associated rare earth ions, which ultimately increases the intensity of the spectral response. It will be appreciated that inorganic sensitizers can withstand very high temperatures, and as such may be used in applications where high temperatures would destroy the organic ligands.

Similarly, organic sensitizers, in the form of ligands, that act as organic chromophores may be coordinated to a rare earth ion, such ligated rare earth ions will typically (as compared to unligated rare earth ions) have an increased ability to absorb light, especially at specific frequencies. The excitation spectra of a rare earth ion can be significantly altered by the proper choice of ligands. In a phenomenon often referred to as the antenna effect, these ligands harvest UV and visible light, i.e. the ligands absorb incident UV and visible light and transfer the absorbed energy to the rare earth ions. This increased energy absorption results in an increase in photoluminescence, which is evidenced by more intense peaks in the luminescence spectrum.

In addition to acting as a sensitizer, a ligand may serve the function of blocking water and various other molecules from coordinating with the rare earth ion. It will be appreciated that when molecules, such as water, coordinate with the rare earth ion the excitation spectra may be affected. For example, the coordinated water molecule may quench the photoluminescence, or change the frequency of peaks in the photoluminescence spectrum. In some rare earth complexes, a ligand may be selected solely for this purpose and may not act to harvest energy for the rare earth ion.

A multitude of different rare earth dopants are possible. As indicated above, a rare earth dopant may be in the form of a rare earth ion or a rare earth complex. It will also be appreciated that the term rare earth element refers not only to the lanthanide series of the Periodic Table, but also to various other elements that have properties similar to those in the lanthanide series. For example, scandium and yttrium are commonly thought of as rare earth elements, as are the elements of the Actinide Series of the Periodic Table. Table 1 lists some of the elements that may be selected for use as a rare earth dopant or incorporated into a rare earth complex, however, Eu, Tb, Sm and Dy seem to be particularly well suited for use in the present invention.

TABLE 1

| Element Name | Symbol |
|---|---|
| Lanthanum | La |
| Cerium | Ce |
| Praseodymium | Pr |
| Neodymium | Nd |
| Promethium | Pm |
| Samarium | Sm |
| Europium | Eu |
| Gadolinium | Gd |
| Terbium | Tb |
| Dysprosium | Dy |
| Holmium | Ho |
| Erbium | Er |
| Thulium | Tm |
| Ytterbium | Yb |
| Lutetium | Lu |
| Thorium | Th |

It will be appreciated that while it is not necessary for a rare earth dopant to be ligated, a ligated rare earth dopant may be better suited for certain applications. A multitude of different ligands, several of which are shown in FIGS. 10A-D, may be selected for incorporation into the rare earth complex.

Typically, ligands are selected for incorporation into the rare earth complex on the basis of: chemical stability of the resulting complex; ability to transfer energy to the rare earth ion; absorbance of light at the desired frequency; and/or cost of the ligand.

FIG. 1 shows a greatly enlarged silica particle 100 comprising a silica body 110 (in the form of a silica network) doped with a rare earth dopant 105 (in the form of a rare earth complex). The rare earth dopant 105 is dispersed throughout the silica body 110, typically in a uniform manner. The silica body 110 is porous due to the nature of the silica network.

The rare earth dopant 105 includes a rare earth ion 115, in the form of a europium ion, coordinated to several ligands 120, including three molecules of 2-hydroxy-4-(3-triethoxysilylpropoxy)-diphenylketone ("SiDPK") and one molecule of 1,10-Phenanthroline, as show below.

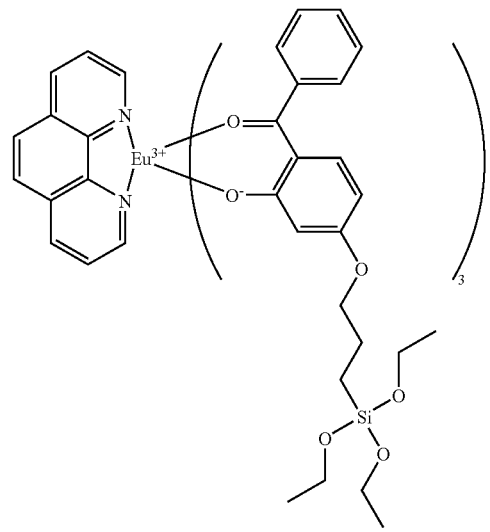

In the present embodiment, the dopant 105 has reacted into the silica network becoming a structural part of it, as opposed to being merely trapped within the silica network. More particularly, the SiDPK ligands bond to the silica of the silica network, while the 1,10-Phenanthroline ligand is merely associated with the same rare earth complex, as the SiDPK ligands.

Table 2 shows the formulation, by weight percentage, of a typical rare earth doped silica particle used in this embodiment, such as the silica particle 100.

TABLE 2

| Component | Wt % |
|---|---|
| SiO$_2$ | 40 to 70% |
| Lanthanide | 1 to 10% |
| Ligand 1 | 3 to 40% |
| Ligand 2 | 1 to 15% |

Generally, a ligand with one or more functional groups, such as an alcohol or phenol group, will form part of the silica network via covalent bonds (in the form of C—O—Si bonds). Conversely, rare earth complexes without these functional groups will typically just be trapped within the silica network.

It will be appreciated that due to the porous nature of the silica network water or other various compounds may get into the particle. If not for the ligands coordinated to the rare earth ion, these impurities would cause a number of problems. For example, the ligands keep the water molecules from coordinating with the rare earth ion, which may keep the rare earth ion from photoluminescing or change the frequency of the photoluminescence.

Figure 2:
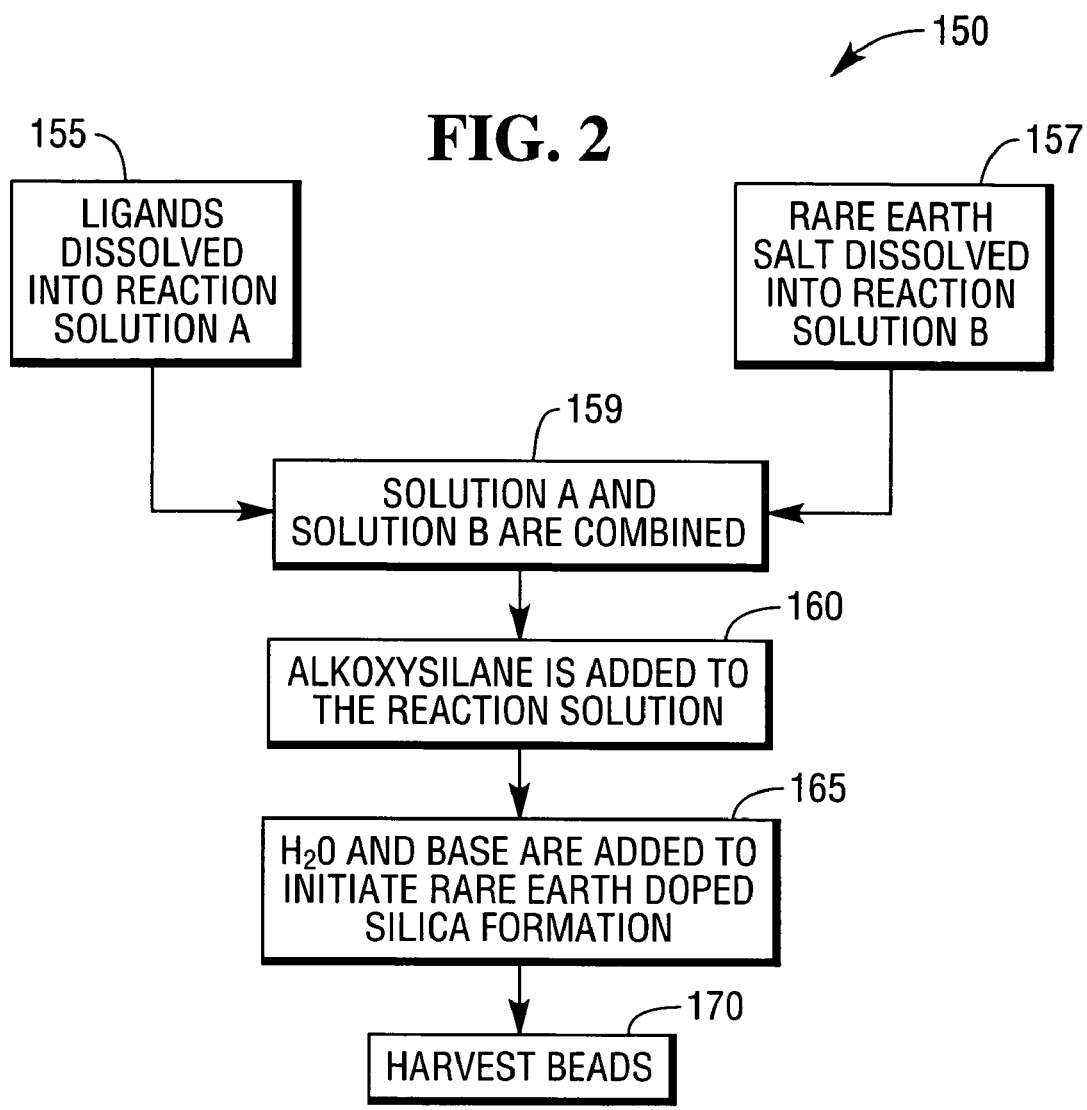
FIG. 2 shows a process for producing the optically detectable security feature of FIG. 1.

FIG. 2 shows a process 150 by which the silica particle 100 of FIG. 1 is synthesized. The process 150 begins by preparing two solutions, reaction solution A and reaction solution B.

Reaction solution A is prepared by dissolving ligands into a solvent (at step 155). Typically, the solvent used to prepare reaction solution A is anhydrous ethanol. Other anhydrous solvents may be added to enhance the solubility of the ligands. In some embodiments, other short chain alcohols may be used instead of ethanol.

Reaction solution B is prepared by dissolving an anhydrous rare earth salt, in the form of a rare earth complex with the formula $Ln(CF_3SO_3)_3$ (where Ln is a rare earth ion), into a solvent (at step 157). Typically, the solvent used to prepare the reaction solution B is anhydrous ethanol, though in some embodiments other anhydrous solvents may be added to enhance the solubility of the rare earth salt. In some embodiments short chain alcohols other than ethanol may be used for the reaction solution. It will be appreciated that any of a number of different rare earth complexes, besides the rare earth salt, may be selected and added to the reaction solution B. For example, anhydrous chlorides may also be used instead. Similarly, the rare earth ion may be introduced into the reaction solution via other compounds, such as hydrated salts. However it may be desirable to exclude water from the system at the point the rare earth ion is added, so water does not coordinated with the rare earth ion. Therefore, anhydrous salts may be superior to other molecules containing water.

After reaction solutions A and B have been prepared they are combined (at step 159). This allows the ligands to coordinate with the rare earth ion, creating a ligated rare earth dopant. The reaction may be heated at this step to promote the reaction. The reaction solution is allowed to cool before proceeding to the next step. In some embodiments the ligated rare earth dopant may be preformed. In such cases steps 155 through 159 will be replaced with the step of adding the ligated rare earth dopant to anhydrous ethanol, or other suitable anhydrous solvent.

Once the rare earth dopant is formed, an alkoxysilane, in the form tetraethoxysilane (TEOS), is added to the reaction solution (at step 160). As discussed in greater detail below, it will be appreciated that in other embodiments various other alkoxysilanes may be used in the place of or in combination with TEOS.

The addition of water ($H_2O$) (preferably doubly distilled) and ammonia hydroxide ($NH_4OH$) (at step 165) initiates a reaction that hydrolyzes the TEOS. Subsequently, the hydrolyzed species are condensed forming Si—O—Si bonds. The process continues until silica particles are formed ($SiO_2$). Typically, this reaction will continue for 1 to 24 hours. Each resulting particle comprises a network of silica with the rare earth dopant dispersed throughout. It is essential for the reaction to occur in a basic solution, preferably with a pH between 7.5 and 12, as electrostatic repulsion causes monomer addition to already condensed species. This way, aggregation is avoided and non-soluble particles, in the form of silica particles, are obtained. It will be appreciated that while ammonia is typically used to create the necessary basic environment in the reaction solution, other bases may be used.

The hydrolysis velocity will be strongly related to the diameter of spherical particles and size distribution between the particles. This velocity will be dependent on variables such as, the proportions of water, ammonia and TEOS in the reaction solution, as well as the temperature of the system. Typically, the amount of TEOS, $NH_3$, and water are varied to obtain different diameters of particle. The temperature is typically held constant at ambient room temperature. By means of this method, silica spheres can be obtained with a narrow size distribution of approximately 3 to 4%. Depending on the conditions used, the nominal particle diameter can be selected to be anywhere in the range from 25 nm to 2 microns.

The silica particles are then harvested (170) by separating the particles from the reaction solution. This will typically be done by filtration, however the reaction solution may be centrifuged to separate out the particles.

Figure 3:
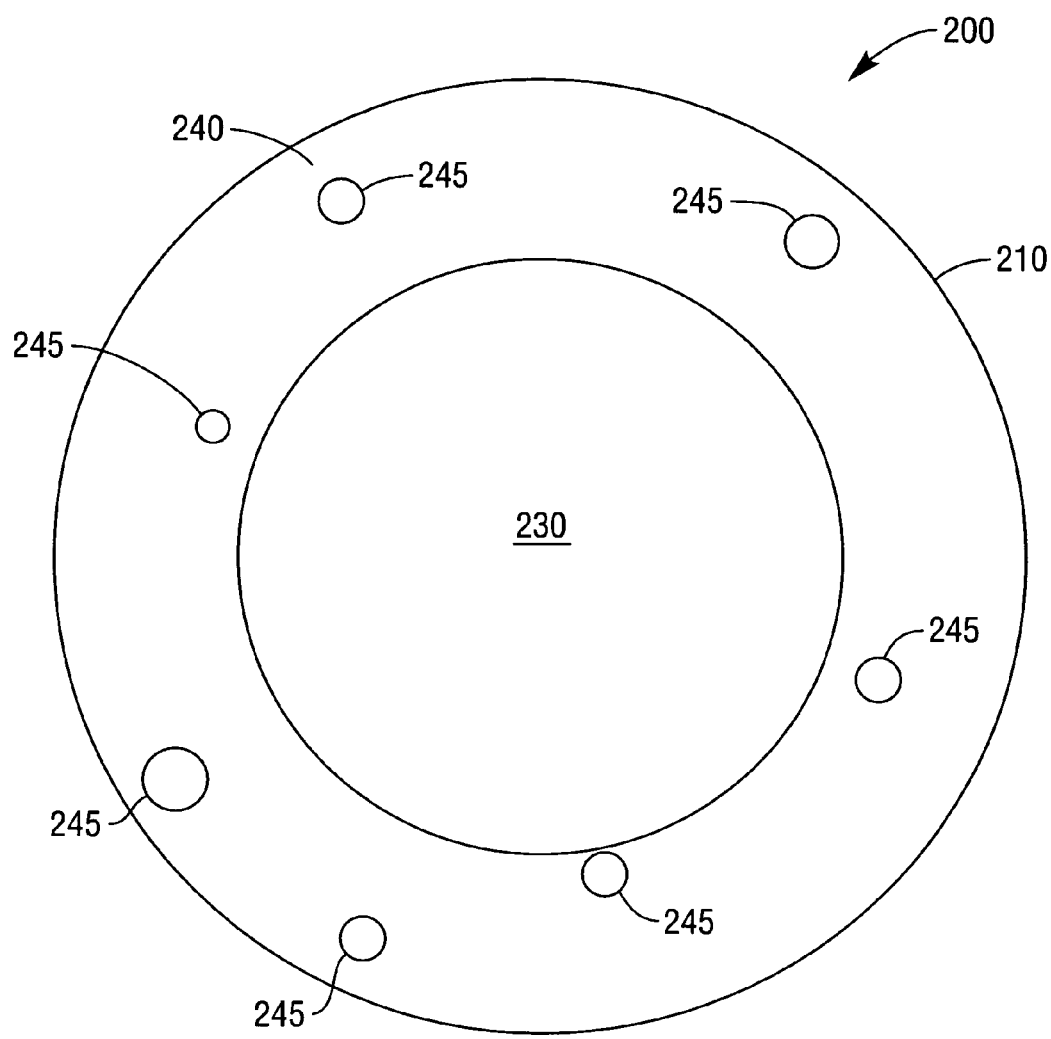
FIG. 3 shows a schematic representation of an optically detectable security feature (in the form of a silica particle) in accordance with another embodiment of the present invention.

FIG. 3 shows a greatly enlarged layered silica particle 200 which has a silica body 210 (in the form of a silica network). The silica body contains a core portion 230 and an outer shell portion 240. In this embodiment the core portion 230 is formed by the silica particle 100, though it will be appreciated that various other types of silica particles may be used. For example, any of the particles discussed herein can be substituted for the silica particle 100. Similarly, fumed silica, which is an amorphous, nonporous form of silicon dioxide, may be used in the core portion.

It will be appreciated that for purposes of convenience the core portion 230 and the outer shell portion 240 are discussed as separate portions, however, the outer shell portion 240 is actually an extension of the silica network of the core portion 230.

The outer shell portion 240 encapsulates the core portion 230. Like the core portion 230, a rare earth dopant 245 is dispersed throughout the shell portion 240 and may be reacted into the silica network or just trapped within the silica network. Typically, the rare earth dopant used in the outer shell will be different from that used in the core. Moreover, the rare earth dopant will typically be in the form of a rare earth complex, though in some embodiments an un-ligated rare earth dopant may be used.

In some embodiments, the outer shell will have no rare earth dopants, such that the outer shell merely serves as a protective layer around the core. For example, the protective layer may shield a rare earth dopant positioned on the surface of the core from contaminates in the local environment that may otherwise affect the spectral response of the dopant.

It will be appreciated that while the layered silica particle 200 is shown as only having one shell, some embodiments may have multiple shells. For example, a second silica shell may be provided that encapsulates the layered silica particle 200. Typically, in such embodiments where multiple shells are layered around the core portion each shell may be doped with a different rare earth dopant. Although in other embodiments, one or more of the core and shell portions may not contain a rare earth dopant.

Figure 4:
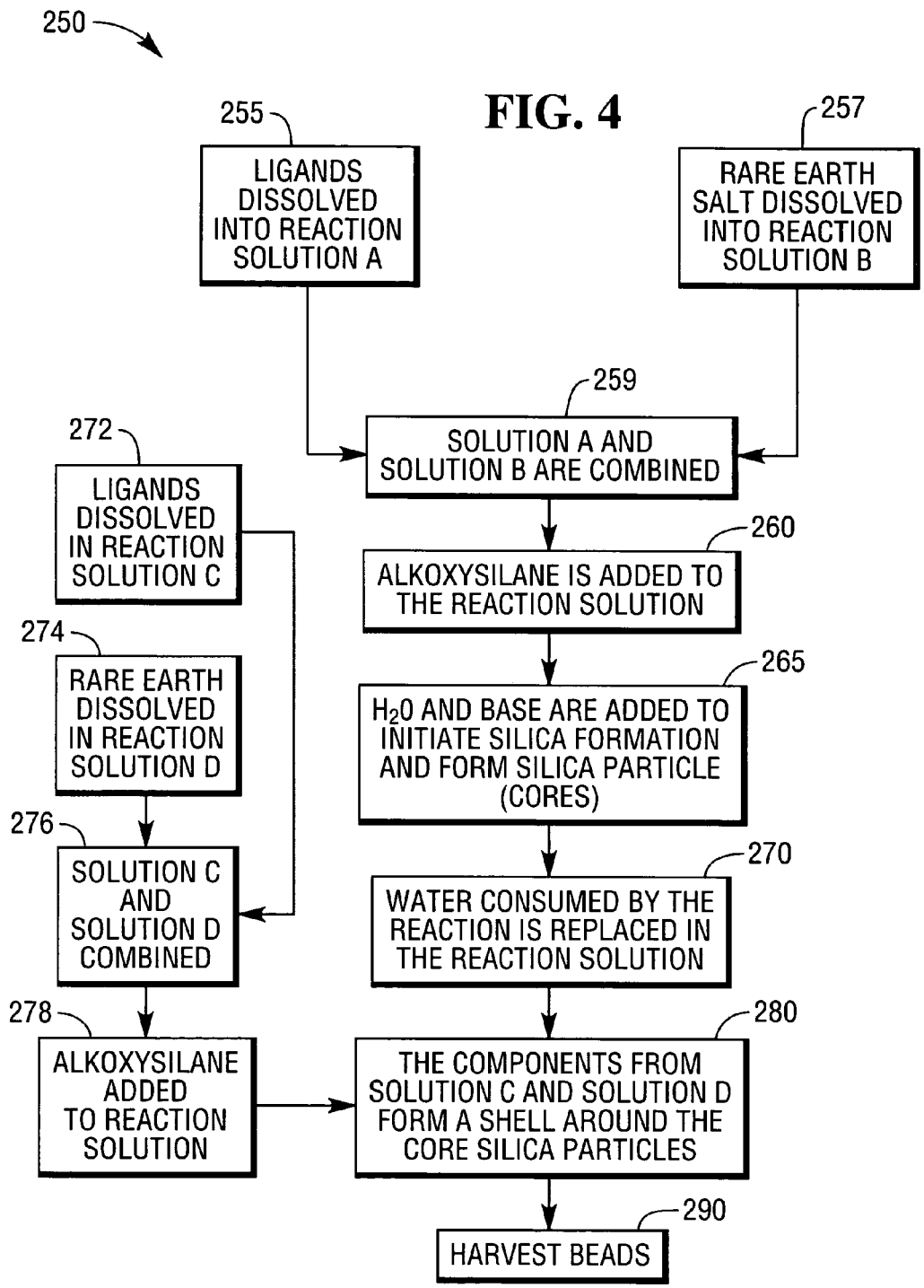
FIG. 4 shows a process for producing the optically detectable security feature of FIG. 3.

FIG. 4 shows process 250 by which the layered silica particle 200 of FIG. 3 is produced. The first five steps of process 250 are very similar to those of the process 150. First, reaction solution A is prepared by dissolving ligands into a solvent (at step 255) and reaction solution B is prepared by dissolving a rare earth complex, in the form of a rare earth salt, into a solvent (at step 257). The two solutions are combined into reaction solution AB in which ligated rare earth complexes form (at step 259). Time and/or heat are applied as needed to promote the formation of the ligated rare earth complexes. Typically, the solvent used to create the reaction solutions A and B will be anhydrous ethanol, though as discussed above various other solvents may be used or added to the anhydrous ethanol.

In some embodiments the ligated rare earth dopant may be preformed. In such cases steps 255 through 259 will be replaced with the step of adding the ligated rare earth dopant to anhydrous ethanol, or other suitable anhydrous solvent.

An alkoxysilane, in the form of TEOS, is added to the reaction solution AB (at step 260). Subsequently, a hydrolysis reaction is initiated by the addition of water and base to the reaction solution (at step 265). This reaction forms silica particles, in the form of a silica network, impregnated with the rare earth complexes formed in step 259. Once, the reaction has ceased, the water consumed in step 265 is replaced in the reaction solution AB (at step 270).

In two separate containers reactions solutions C and D are prepared. A second rare earth ion is dissolved into reaction solution D (at step 274). Reaction solution D is prepared in a very similar manner to that of solution B, however, the rare earth complex added at step 274 will typically be different from that used in step 257. Generally a rare earth complex will contain a different rare ion.

Similarly, solution C is prepared by dissolving ligands into the reaction solution C (at step 272). The ligands may be the same or different than the ligands used in step 255. Solutions C and D are combined to form reaction solution CD (at step 276). Time and/or heat are applied as needed to the reaction solution CD to promote the synthesis of ligated rare earth complexes. In some embodiments the ligated rare earth dopant may be preformed. In such cases steps 272 through 276 will be replaced with the step of adding the ligated rare earth dopant to anhydrous ethanol, or other suitable anhydrous solvent.

After reaction solution CD is formed at step 276, an alkoxysilane, in the form of TEOS, is then added to the reaction solution CD (at step 278).

Once steps 270 and 278 are complete, reaction solution AB and CD are combined (at step 280). This initiates a silica forming reaction that forms a shell around the silica particles formed at step 265. The shell is actually a continuation of the silica network of the particle formed in step 265, though the shell portion of the silica network will contain the rare earth dopant added at step 275.

The layered silica particles are then harvested (290). This will typically be done by filtration, however, in some embodiments, the reaction solution may be centrifuged to separate out the layered silica particles.

In some embodiments, steps 270 to 280 may be repeated, prior to performing steps 290, to produce silica particles with multiple shells.

FIG. 5 shows greatly enlarged a silica particle 300 with a rare earth dopant dispersed throughout. The silica particle 300 is very similar to the silica particle 100, in that the silica particle 300 includes a silica body 310, in the form of a silica network, and a rare earth dopant 305 dispersed throughout the silica body 310. However, in this embodiment the rare earth dopant 305 is in the form of an unligated rare earth ion, as opposed to the rare earth complex found in the silica particle 100. The silica body 310 is porous due to the nature of the silica network.

The dopant 305 is trapped within the silica network, as opposed to forming a covalent bond with the silicon of the network, though in other embodiments the rare earth ion may actually bond to the silicon of the network becoming an integral part of the network.

As shown, the rare earth dopant 305 comprises the lanthanide europium ("Eu"). However, it will be appreciated that various other elements may be selected, such as those listed in Table 1 above.

In some embodiments where an unligated rare earth dopant is used it may be advantageous to incorporate an inorganic sensitizer into the silica particle in addition to the rare earth dopant The process by which the silica particle 300 is synthesized is very similar to process 150; the main difference being that the solution A is omitted from the process.

The resulting unligated silica particles 300 are more stable to high temperatures, as compared to ligated silica particles, such as silica particle 100 or 200. This higher tolerance to heat is attributable to the rare earth dopant 305 being inorganic, i.e. it does not have organic ligands coordinated to it. The higher heat tolerance of the silica particle 300 is significant in that it may undergo additional processing that requires significant increases in temperature that would destroy organic ligands.

For example, after the silica particles 300 are harvested from the reaction solution they may undergo a calcination process, where the particles are heated to between 800 to 1500 degrees Celsius. This process drives water and other volatile compounds out of the silica network, thereby reducing the size of the silica particles. This reduction is size is also attributable to the reaction between silanols on the surface and in the pores of the silica particle. The high temperature forces the condensation of silanols (Si—OH) to form Si—O—Si bonds, thereby reducing the size of the silica particles.

Similarly, these unligated silica particles may undergo the additional step of high temperature baking causing the dopant to react with the silica network and become a structural part thereof, as opposed to merely being trapped with in the network. In some cases, the high temperature baking may cause the silica network to collapse as well, which results in a nonporous silica particle. Similarly, flame spheridization may be used to create nonporous particles.

The silica particles discussed above are porous due to the structure of the silica network, which allows contaminates, such as water, to enter into the silica particle. This water may contaminate the silica particle by coordinating with the rare earth ions, thereby affecting the spectral response of the silica particle. Likewise, rare earth dopants located on the surface of a silica particle may be similarly contaminated. Therefore, in some embodiments it may be desirable to seal the pores and make the surface of the silica particle hydrophobic.

Silanols (Si—OH) are found on the surface (including the surface of the pores) of the silica particles, rendering the surface of the silica particle surface hydrophilic. For some applications it may be desirable to have the surface of the particles hydrophobic. The silanols can be replaced by reacting the silanols with various organic compounds, such as long chain alcohols, chlorosilanes, alkoxysilanes or ethyltrimethoxysilane, thus rendering the surface of the silica particle hydrophobic.

For example, by reacting the hydroxyl group of a long chain alcohol with the surface silanols a Si—O—C bond is created between the alcohols hydrocarbon chain and the silica particle, thus creating an organic-coated silica particle that is hydrophobic. Although such bonds may be hydrolytically unstable, the organic portion of the alcohol acts as a barrier to prevent the corroding $H_2O$ from reaching the bond and hydrophobicity of the silica particle will be maintained.

Examples of chlorosilanes include n-octyldimethylchlorosilane, n-octyltrichlorosilane and methyltrichlorosilane. Examples of alkoxysilanes include octyldimethylmethoxysilane, n-octylytriethoxysilane and methyltrimethoxysilane. It will be appreciated that the reaction between a chlorosilane and a silanol produces a bond that is much more hydrolytically stable than the reaction between a silanol and the long chain alcohol. The same is true for the alkoxysilane.

FIG. 6 shows a hydrophobic silica particle 500, which includes a core silica particle 510 coated with an organic layer 520. It will be appreciated that 510 may be any of silica particles 100, 300, or 500; and the organic layer 520 comprises many hydrophobic hydrocarbons bonded to the surface of the silica particle 510.

Figure 7:
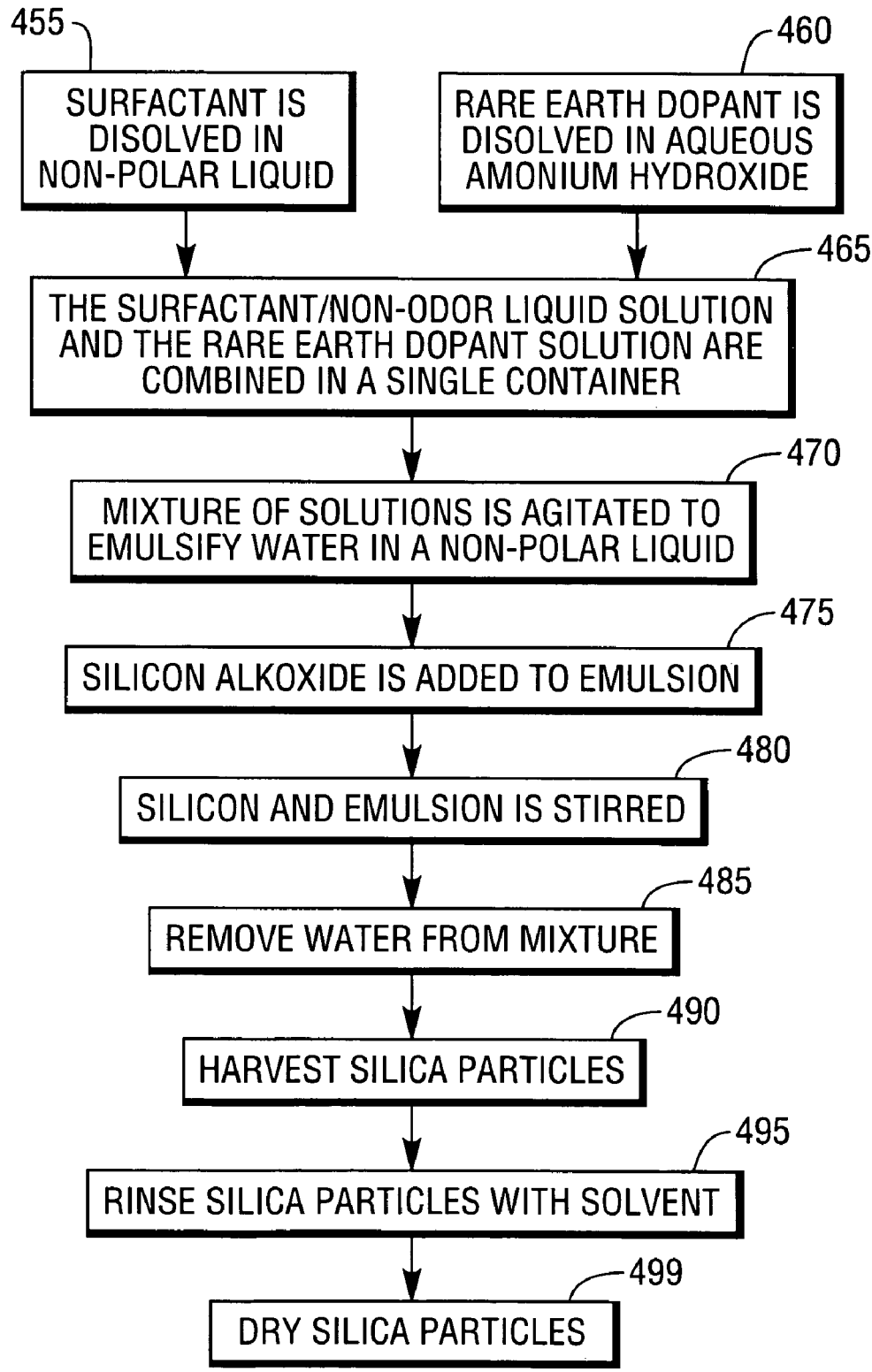
FIG. 7 shows an alternative process for producing the optically detectable security feature of FIGS. 1, 3 and 5.

Silica particles, such as those shown in FIG. 1 and FIG. 5, can also be synthesized through a reverse micro-emulsion process 450, as illustrated in FIG. 7. Process 450 is initiated by preparing two solutions. One solution is prepared (at step 455) by dissolving a surfactant in a non-polar liquid, such as n-octane. Typically, 1 to 10 grams of surfactant is dissolved in 125 grams of non-polar liquid. Any solvent that is not miscible with water will work. The other solution is prepared (at step 460) by dissolving rare earth dopant in aqueous ammonium hydroxide. The total volume of this solution will typically be 1 to 25 ml, with the rare earth dopant accounting for 1 to 20% of that volume. It will be appreciated that while step 460 discusses dissolving rare earth dopant in a basic solution, such may be done in an acidic solution.

Next, the two solutions prepared in steps 455 and 460 are combined in a single flask (or other suitable container) (at step 465). Once combined the mixture is agitated (at step 470), until the resulting emulsion comprises micro droplets of the aqueous ammonium hydroxide solution suspended in the non-polar liquid.

It will be appreciated that the mixture may be agitated using any of a number of methods, such as by sonicating, stirring, shaking, heating or any combination of these methods. For example, in some embodiments the mixture in the flask is first vigorously stirred. The flask is then sealed, typically with use of a stopper and the emulsion is then sonicated, typically for at least 20 minutes. While still sealed in the flask the emulsion is then magnetically stirred, generally for 20 to 100 hours.

Once the proper emulsion has been achieved, the flask is unsealed and 1 to 25 grams of a alkoxysilane, (typically TEOS will be used) is added to the flask and then it is resealed (at step 475). The addition of the TEOS initiates a hydrolysis reaction resulting in the synthesis of silica particles impregnated with rare earth dopant. In order to promote this reaction, the TEOS and the emulsion is again stirred, typically for 1 to 30 hours (at step 480). The hydrolysis reaction that forms the silica particles occurs within each of the micro droplets.

Once the silica particles are formed, water is removed from the mixture (at step 485). Typically, this will be done using a Dean Stark trap, though in some embodiments, other methods of water removal will be used. It may also be advantageous at this point to remove additional liquid, though care should be taken not to remove any of the silica particles.

The particles are then harvested from the remaining mixture (at step 490), generally this will be done by filtering, but other methods such as centrifuging may alternatively be used. The harvested silica particles are then rinsed with solvent (at step 495) and then dried (at step 499). Silica particles in the range of 5 to 1000 nm with a narrow size distribution may be synthesized by using process 450.

Figure 8:
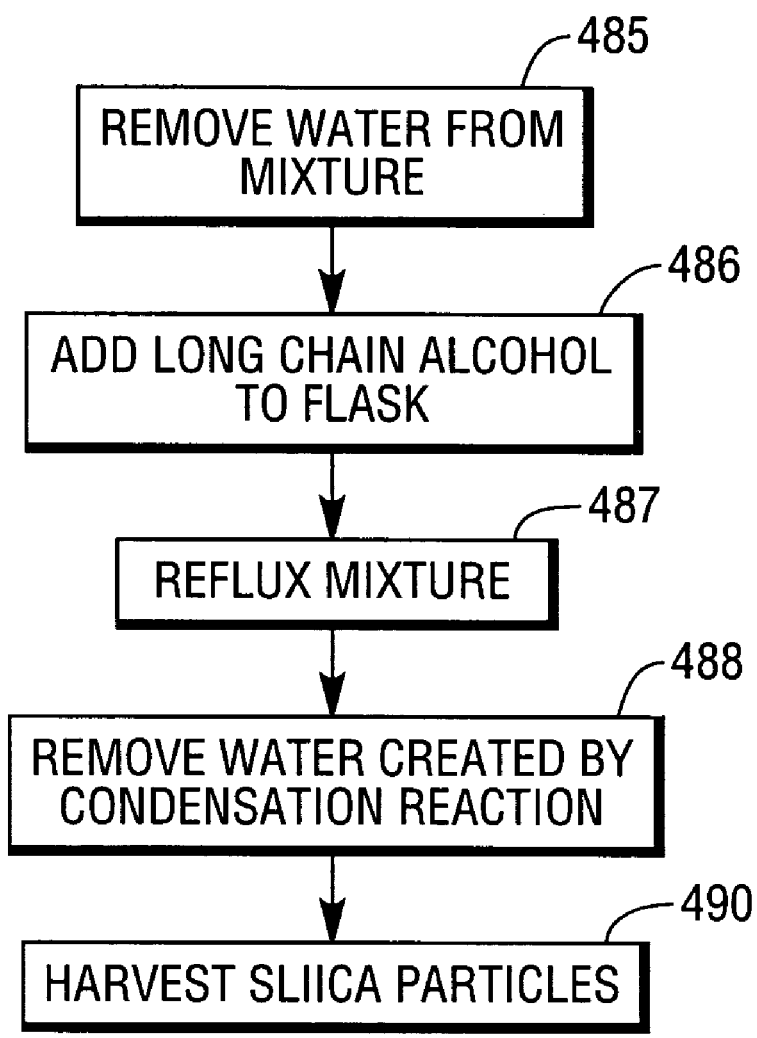
FIG. 8 shows a process for producing the optically detectable security feature of FIG. 6.
Figure 10A:
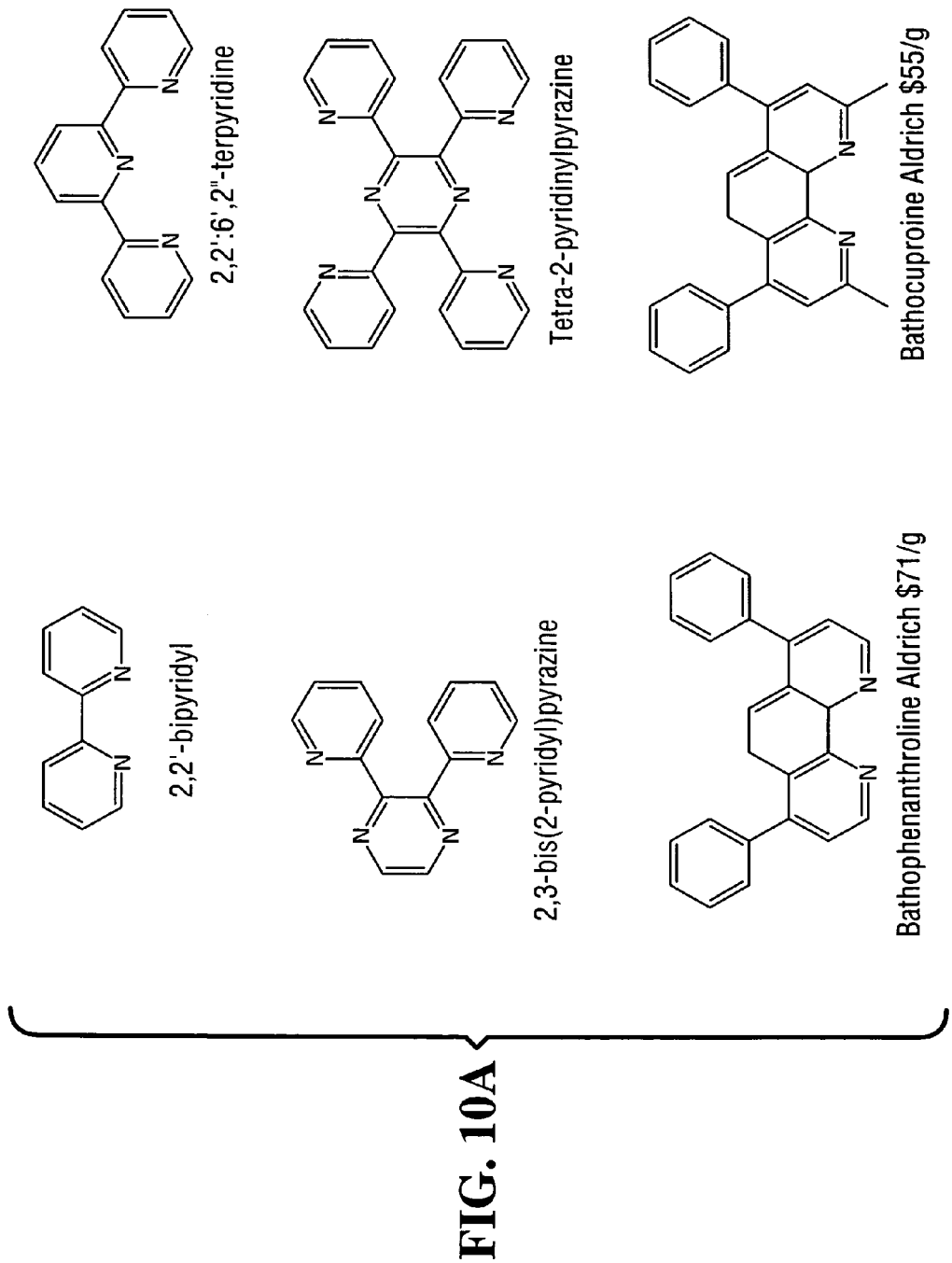
Figure 10C:
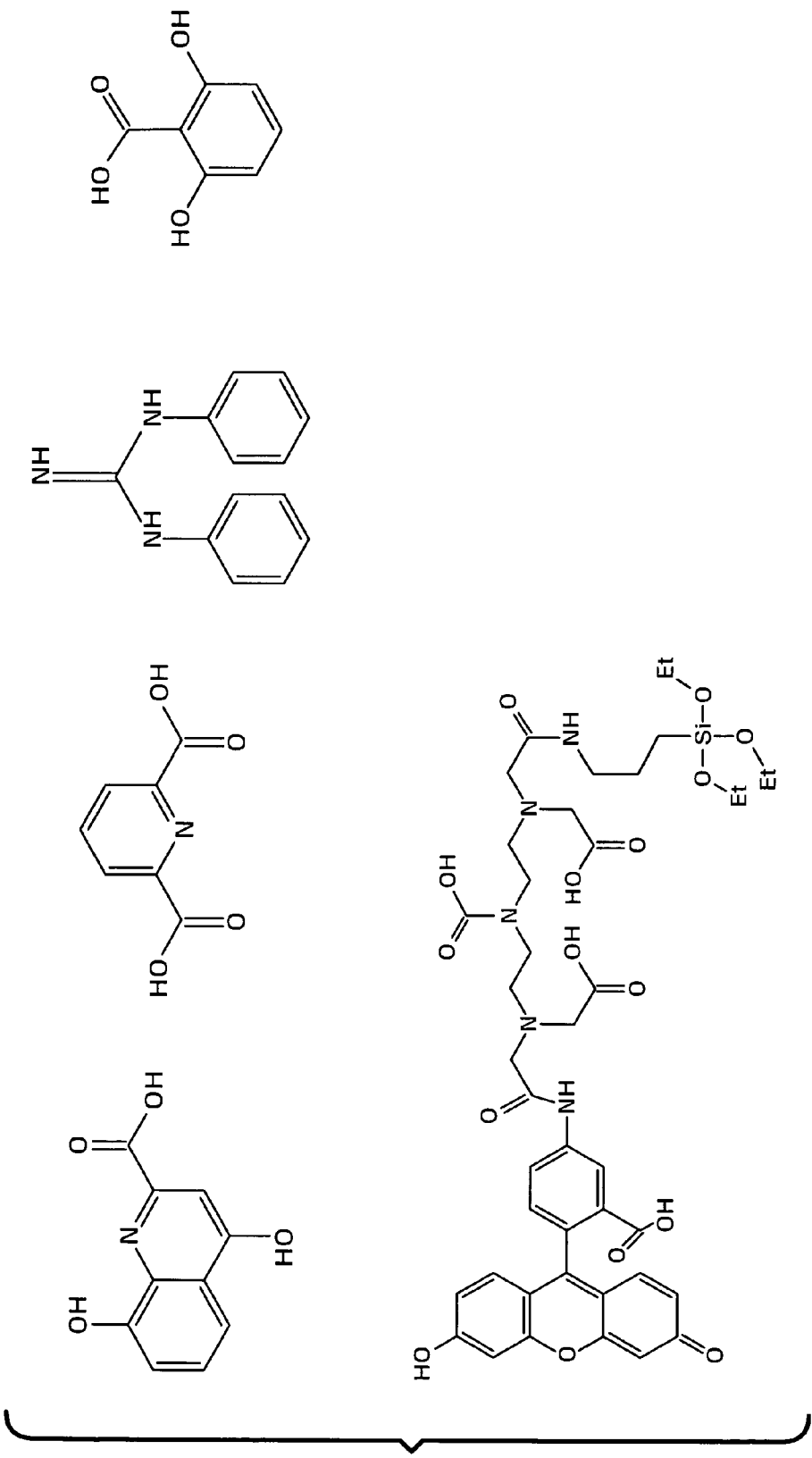
Figure 10D:
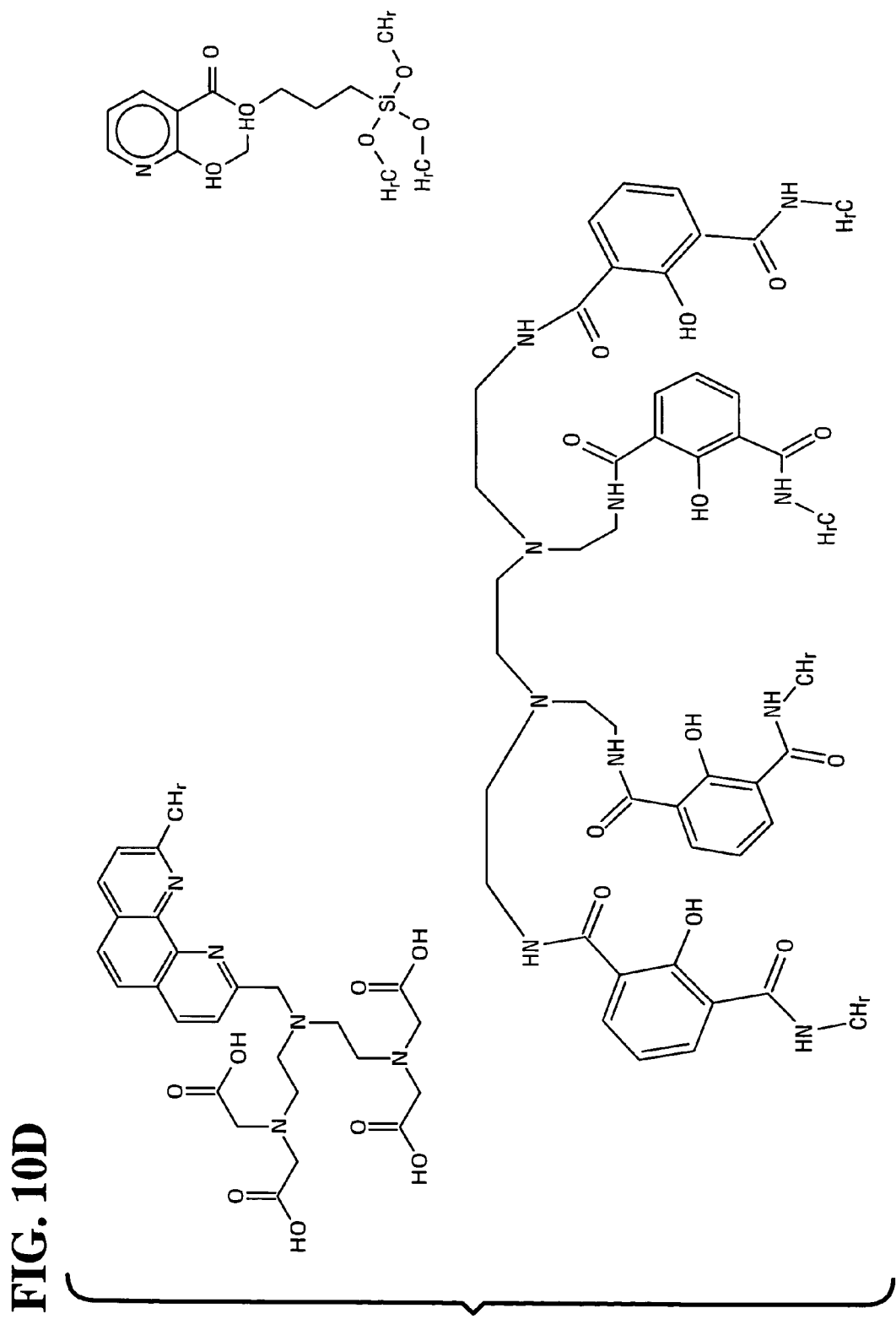

As discussed above, it may be advantageous to make the surface of the silica particles hydrophobic. FIG. 8 and FIG. 9 show modifications that may be made to process 450 that may be used to synthesize hydrophobic silica particles.

FIG. 8 shows process 550 for producing hydrophobic silica particles. Process 550 employs steps 455 through 485 in a very similar manner to that of process 450, though after the water is removed at step 485 a long chain alcohol is added to the mixture (at step 486), typically 0.05 to 1 gram will be added. The mixture is then refluxed (at step 487) to promote a condensation reaction between the hydroxyl group of the long chain alcohol and the silanols on the surface of the silica particles. Typically, the mixture will be refluxed for 1 to 8 hours. After the refluxing step, the additional water created by the condensation reaction is removed (at step 488). Once this additional water is removed, process 550 proceeds to the harvesting step 490 and thereafter proceeds according to process 450. In some embodiments steps 487 and 488 are combined into one step. For example, a Dean Stark trap may be used to reflux the mixture, which also functions to remove the water from the mixture.

FIG. 9 shows process 650, which is an alternative method of synthesizing hydrophobic silica particles. Process 650 employs steps 455-475 in an identical manner to that of process 450, though after the mixture is stirred at step 480 ethyltrimethoxysilane is added to the mixture (at step 481), typically 0.05 to 1 gram will be added. The ethyltrimethoxysilane mixture is then refluxed (at step 482) to promote a hydrolysis of the ethyltrimethoxysilane. The hydrolyzed ethyltrimethoxysilane then condenses with the silanols on the surface of the silica particles. Typically, the mixture will be refluxed for 4 to 12 hours. After the refluxing step, the water in the mixture is removed (at step 485). Then the mixture is again refluxed (at step 489), typically for 2 to 4 hours. During the second reflux the water is continuously removed using a Dean Stark trap. Once the mixture has been refluxed for the second time, process 650 proceeds to the harvesting step 490 and thereafter proceeds according to process 450.

Various modifications may be made to the above described embodiments, within the scope of the present invention.

In the embodiments discussed above, the silica particles are synthesized in a reaction solution comprising ethanol (EtOH), water ($H_2O$) (preferably doubly distilled) and ammonia hydroxide ($NH_4OH$). By carrying out a hydrolysis reaction in such a solution, silica particles with diameters ranging from 25 nm to 2 microns can be obtained with a narrow size distribution of approximately 3 to 4%. Various alterations and substitutions may be made to the reaction solution in order to change the properties of the resulting silica particles, such as size, including uniformity in the size of the silica particles.

It will be appreciated that a number of variables affect the reaction kinetics and the size of the resulting particles, and as such can be controlled to synthesize silica particles of a desired size. For example, the hydrolysis velocity is strongly related to the diameter of spherical particles and size distribution between the particles. Typically, the faster the reaction the smaller resulting silica particle will be. This velocity will be dependent on variables such as, the proportions of water, ammonia and alkoxysilane in the reaction solution, as well as the temperature of the system. The relationships between these variables are described in greater detail in the papers by Bogush et al and Stober et al. (see G. H. Bogush, M. A., Tracy and C. F. Zukoski IV, *Preparation of Monodisperse Silica Particles*: Control Of Size And Mass Fraction, 104 Journal of Non-Crystalline Solids 95-106 (1988); and Werner Stober, Arthur Fink & Ernst Bohn, *Controlled Growth of Monodisperse Silica Spheres in the Micron Size Range,* 26 Journal of Colloid and Interface Science 62-69 (1968)). Typically, the amount of alkoxysilane and $NH_3$, and the temperature (i.e. ambient room temperature) are kept constant, while the amount of water is varied to obtain silica particles of different diameters.

Similarly, it will be appreciated that the type of alkoxysilane selected will affect the rate at which silica particles are formed and in turn the size of the resulting particle. In the embodiments discussed above, the silica particles are synthesized from TEOS, however, various other alkoxysilanes may be substituted for TEOS. For example, another tetra-alkoxysilane, such as tetramethoxy, n-tetrapropoxy, n-tetrabutoxy or n-tetrapentoxy may be selected. Alternatively, silanes with branched alkoxy groups may also be used, however, straight chained alkoxysilanes are less expensive and therefore more commonly used.

Moreover, mixed silanes may also be substituted for TEOS. A mixed silane will have the formula $RSi(OR')_3$, $RR"Si(OR')_2$ or $RR"R'" Si(OR')$ (i.e., one, two or three alkoxy units and one, two or three direct Si—C bonds). The significance here is that S—O—R bonds are hydrolyzed to form the silica network, while Si—C bonds are not hydrolyzed and thus do not form part of the silica network. An example of a mixed silane is shown below, which has three alkoxy units and one Si—C bond. TEOS, a non-mixed silane, is provided as a reference.

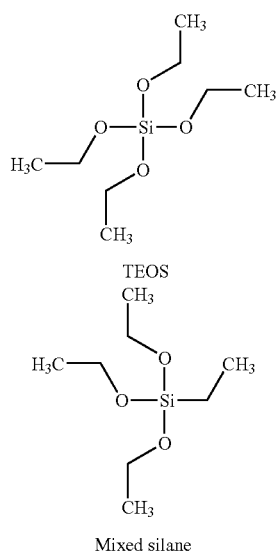

TEOS

Mixed silane

It will also be appreciated that more than one alkoxysilane may be used in the same silica particle. For example, where the silica particle has a core portion and a shell portion, like the embodiment of FIG. 3, the core portion may be synthesized from TEOS and the shell portion may be synthesized from a mixed silane, or vice versa. Similarly, like the embodiments of FIG. 1 and FIG. 5, where there is no shell portion, the silica network may be formed from a mixture of different alkoxysilanes.

It will also be appreciated that instead of ethanol, various other alcoholic solvents may be used, such as methanol or n-butanol. Generally, this will be done to adjust the reaction rate and thus the final size of the synthesized particle. Typically, faster reaction rates will result in smaller silica particles. Similarly, a mixture of different alcohols may be used in the reaction solution. It will be appreciated that the type of alcohol(s) used and the alcohol's concentration within the reaction solution are variable that will affect the size distribution of the resulting silica particles.

Similarly, the velocity of the hydrolysis reaction depends strongly on the water content of the system, and, as such the ratio of water in the system may be adjusted to change the velocity of the reaction.

The invention claimed is:
1. A security feature comprising:
a silica core having a first rare earth dopant profile; and
a silica shell having a second rare earth dopant profile and surrounding the silica core,
wherein (i) the first rare earth dopant profile is different from the second rare earth dopant profile, and (ii) the first rare earth dopant profile comprises a rare earth dopant dispersed throughout the silica core and the rare earth dopant comprises a rare earth ion having an inorganic sensitizer associated therewith, wherein the inorganic sensitizer is positioned to absorb energy and transfer it to the rare earth ion.

2. A security feature comprising:
a silica core having a first rare earth dopant profile; and
a silica shell having a second rare earth dopant profile and surrounding the silica core,
wherein the first rare earth dopant profile is different from the second rare earth dopant profile, and wherein the first rare earth dopant profile comprises at least two types of rare earth dopants dispersed throughout the silica core.

3. A security feature comprising:
a silica core having a first rare earth dopant profile; and
a silica shell having a second rare earth dopant profile and surrounding the silica core,
wherein the first rare earth dopant profile is different from the second rare earth dopant profile, and wherein the first rare earth dopant profile does not include any rare earth dopant.

4. A security feature comprising:
a silica core having a first rare earth dopant profile; and
a silica shell having a second rare earth dopant profile and surrounding the silica core,
wherein the first rare earth dopant profile is different from the second rare earth dopant profile, and wherein the first rare earth dopant profile comprises a first type of rare earth dopant dispersed throughout the silica core and the second rare earth dopant profile comprises a second type of rare earth dopant dispersed throughout the silica shell.

5. A security feature comprising:
a silica core having a first rare earth dopant profile; and
a silica shell having a second rare earth dopant profile and surrounding the silica core,
wherein the first rare earth dopant profile is different from the second rare earth dopant profile, and wherein the silica shell comprises a plurality of silica layers radially spaced from the silica core.

6. The security feature of claim 5, wherein the plurality of silica layers include at least an inner layer, a middle layer and an outer layer, and wherein the second rare earth dopant profile comprises a first rare earth dopant dispersed throughout the inner layer and a second rare earth dopant dispersed throughout the middle layer.

7. The security feature of claim 6, wherein the outer layer contains no rare earth dopant.

8. A security feature comprising:
a silica core having a first rare earth dopant profile; and
a silica shell having a second rare earth dopant profile and surrounding the silica core,
wherein the first rare earth dopant profile is different from the second rare earth dopant profile, and wherein the silica shell provides a porous surface.

9. The security feature of claim 8, further comprising a plurality of hydrocarbon molecules each having a bond end and a hydrophobic end, the bond end of the plurality of hydrocarbon molecules being bonded to the surface of the silica shell, thereby blocking pores on the porous surface and forming a hydrophobic layer around the silica shell.

* * * * *